T
US011062095B1

(12) United States Patent
Lev-Tov et al.

(10) Patent No.: US 11,062,095 B1
(45) Date of Patent: Jul. 13, 2021

(54) LANGUAGE TRANSLATION OF TEXT INPUT USING AN EMBEDDED SET FOR IMAGES AND FOR MULTILANGUAGE TEXT STRINGS

(71) Applicant: SHUTTERSTOCK, INC., New York, NY (US)

(72) Inventors: Manor Lev-Tov, Brooklyn, NY (US); Nicholas Alexander Lineback, Denver, CO (US); Michael Ranzinger, Boulder, CO (US)

(73) Assignee: Shutterstock, Inc., New York, NY (US)

( * ) Notice: Subject to any disclaimer, the term of this patent is extended or adjusted under 35 U.S.C. 154(b) by 72 days.

(21) Appl. No.: 16/578,927

(22) Filed: Sep. 23, 2019

Related U.S. Application Data

(62) Division of application No. 15/851,664, filed on Dec. 21, 2017, now Pat. No. 10,445,431.

(60) Provisional application No. 62/438,220, filed on Dec. 22, 2016.

(51) Int. Cl.
| | |
|---|---|
| *G06F 40/40* | (2020.01) |
| *G06F 16/532* | (2019.01) |
| *G06N 3/08* | (2006.01) |
| *G06F 40/58* | (2020.01) |
| *G06F 40/211* | (2020.01) |
| *G06F 40/242* | (2020.01) |
| *G06F 40/247* | (2020.01) |
| *G06F 40/253* | (2020.01) |

(52) U.S. Cl.
CPC .......... *G06F 40/40* (2020.01); *G06F 16/532* (2019.01); *G06F 40/211* (2020.01); *G06F 40/242* (2020.01); *G06F 40/247* (2020.01); *G06F 40/253* (2020.01); *G06F 40/58* (2020.01); *G06N 3/08* (2013.01)

(58) Field of Classification Search
None
See application file for complete search history.

(56) References Cited

U.S. PATENT DOCUMENTS

| | | | | |
|---|---|---|---|---|
| 2008/0172637 | A1* | 7/2008 | Chang | G06F 40/58 715/846 |
| 2009/0048820 | A1* | 2/2009 | Buccella | G06F 40/58 704/2 |
| 2013/0231916 | A1* | 9/2013 | Huerta | G06F 40/45 704/5 |

(Continued)

*Primary Examiner* — Douglas Godbold
(74) *Attorney, Agent, or Firm* — McDermott Will & Emery LLP

(57) ABSTRACT

A method for receiving a first text in a source language is provided. The method includes associating the first text in the source language with a first vector, selected from a plurality of vectors associated with the source language in an embedded set, and identifying a second vector that is closer to the first vector than a pre-selected threshold. The second vector is associated with a second text in a target language. The method includes associating the first text in the source language with the second text in the target language, wherein the embedded set includes a first image vector for a first image and a second image vector for a second image, and returning the second text in the target language, the second text being a translation of the first text from the source language to the target language. A system configured to perform the above method is also provided.

18 Claims, 8 Drawing Sheets

(56) References Cited

U.S. PATENT DOCUMENTS

| | | | |
|---|---|---|---|
| 2014/0244263 A1* | 8/2014 | Pontual | H04N 21/475 704/260 |
| 2014/0303961 A1* | 10/2014 | Leydon | G10L 13/08 704/2 |
| 2014/0358519 A1* | 12/2014 | Mirkin | G06F 40/51 704/3 |
| 2015/0161144 A1* | 6/2015 | Goto | G06F 40/45 707/739 |
| 2016/0342586 A1* | 11/2016 | Cuthbert | G06F 40/40 |
| 2017/0243081 A1* | 8/2017 | Abou Mahmoud | G06F 40/20 |

\* cited by examiner

US 11,062,095 B1

LANGUAGE TRANSLATION OF TEXT INPUT USING AN EMBEDDED SET FOR IMAGES AND FOR MULTILANGUAGE TEXT STRINGS

CROSS-REFERENCE TO RELATED APPLICATIONS

The present application claims the benefit of priority under 35 U.S.C. § 120 as a divisional from U.S. Utility application Ser. No. 15/851,664, entitled "LANGUAGE TRANSLATION OF TEXT INPUT USING AN EMBEDDED SET FOR IMAGES AND FOR MULTI-LANGUAGE TEXT STRINGS," by Manor LEV-TOV et-al, filed on Dec. 21, 2017, and is related to and claims priority under 35 U.S.C. § 119(e) of U.S. Provisional Patent Application No. 62/438,220, entitled "LANGUAGE TRANSLATION OF TEXT INPUT USING AN EMBEDDING SPACE FOR IMAGES AND FOR MULTI-LANGUAGE QUERIES," by Manor LEV-TOV et-al, filed on Dec. 22, 2016, the contents of which are hereby incorporated by reference in their entirety, for all purposes.

BACKGROUND

Field

The present disclosure generally relates to language translation of text input using related image associations of a source language and a target language. More specifically, the present disclosure relates to translation tools configured to receive an input text string in a source language and to translate it to an output text string in a target language.

Description of the Related Art

Translation tools associated with a multimedia database commonly have the limitation of performing a sequence to sequence translation of a text string between two languages using a textual "dictionary." Further, some applications include language identification routines that automatically select the target language as the user types the text for a query, without a specific language designation by the user. However, even when the language detection is accurate, which is not always the case, a textual translation is not suitable to overcome language idiosyncrasies (e.g., jargon, popular expressions and phrases, and the like), which eventually lead to incorrect matchings and a frustrating experience for the user.

SUMMARY

In one embodiment of the present disclosure, a computer-implemented method is described for receiving a first text string in a source language from a user via a client device. The computer-implemented method includes associating the first text string in the source language with a first text string vector, selected from a plurality of text string vectors associated with the source language in an embedded set, and identifying a second text string vector that is closer to the first text string vector than a pre-selected threshold in the embedded set, the second text string vector associated with a second text string in a target language. The computer implemented method also includes associating the first text string in the source language with the second text string in the target language, wherein the embedded set includes a first image vector for a first image associated with the first text string and a second image vector for a second image associated with the second text string in the target language, and returning the second text string in the target language to the user, the second text being a translation of the first text string from the source language to the target language.

According to one embodiment, a system is described that includes one or more processors and a memory coupled to the one or more processors, the memory including instructions that, when executed by the one or more processors, cause the one or more processors to receive a first text string in a source language from a user via a client device. The one or more processors further execute instructions to associate the first text string in the source language with a first text string vector selected from a plurality of text string vectors associated with the source language in an embedded set and to identify a second text string vector that is closer to the first text string vector than a pre-selected threshold in the embedded set, the second text string vector associated with a second text string in a target language. The one or more processors, further execute instructions to associate the first text string in the source language with the second text string in the target language, wherein the embedded set includes a first image vector for a first image associated with the first text string and a second image vector for a second image associated with the second text string in the target language, and to return the second text string in the target language to the user, the second text being a translation of the first text string from the source language to the target language.

According to one embodiment, a non-transitory, machine readable medium is described that includes instructions, which when executed by one or more processors, cause a computer to perform a method for receiving a first text string in a source language from a user via a client device. The method includes associating the first text string in the source language with a first text string vector, selected from a plurality of text string vectors associated with the source language in an embedded set, and identifying a second text string vector that is closer to the first text string vector than a pre-selected threshold in the embedded set, the second text string vector associated with a second text string in a target language. The method also includes associating the first text string in the source language with the second text string in the target language, wherein the embedded set includes a first image vector for a first image associated with the first text string and a second image vector for a second image associated with the second text string in the target language, and returning the second text string in the target language to the user, the second text being a translation of the first text string from the source language to the target language.

In yet other embodiment, a system is described that includes a means for storing commands and a means for executing the commands causing the system to perform a method that includes receiving a first text string in a source language from a user via a client device and associating the first text string in the source language with a first text string vector, selected from a plurality of text string vectors associated with the source language in an embedded set. The method also includes identifying a second text string vector that is closer to the first text string vector than a pre-selected threshold in the embedded set, the second text string vector associated with a second text string in a target language. The method also includes associating the first text string in the source language with the second text string in the target language, wherein the embedded set includes a first image vector for a first image associated with the first text string and a second image vector for a second image associated with the second text string in the target language, and returning the second text string in the target language to the user, the second text being a translation of the first text string from the source language to the target language.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In the figures, elements and steps denoted by the same or similar reference numerals are associated with the same or similar elements and steps, unless indicated otherwise.

DETAILED DESCRIPTION

Figure 1:
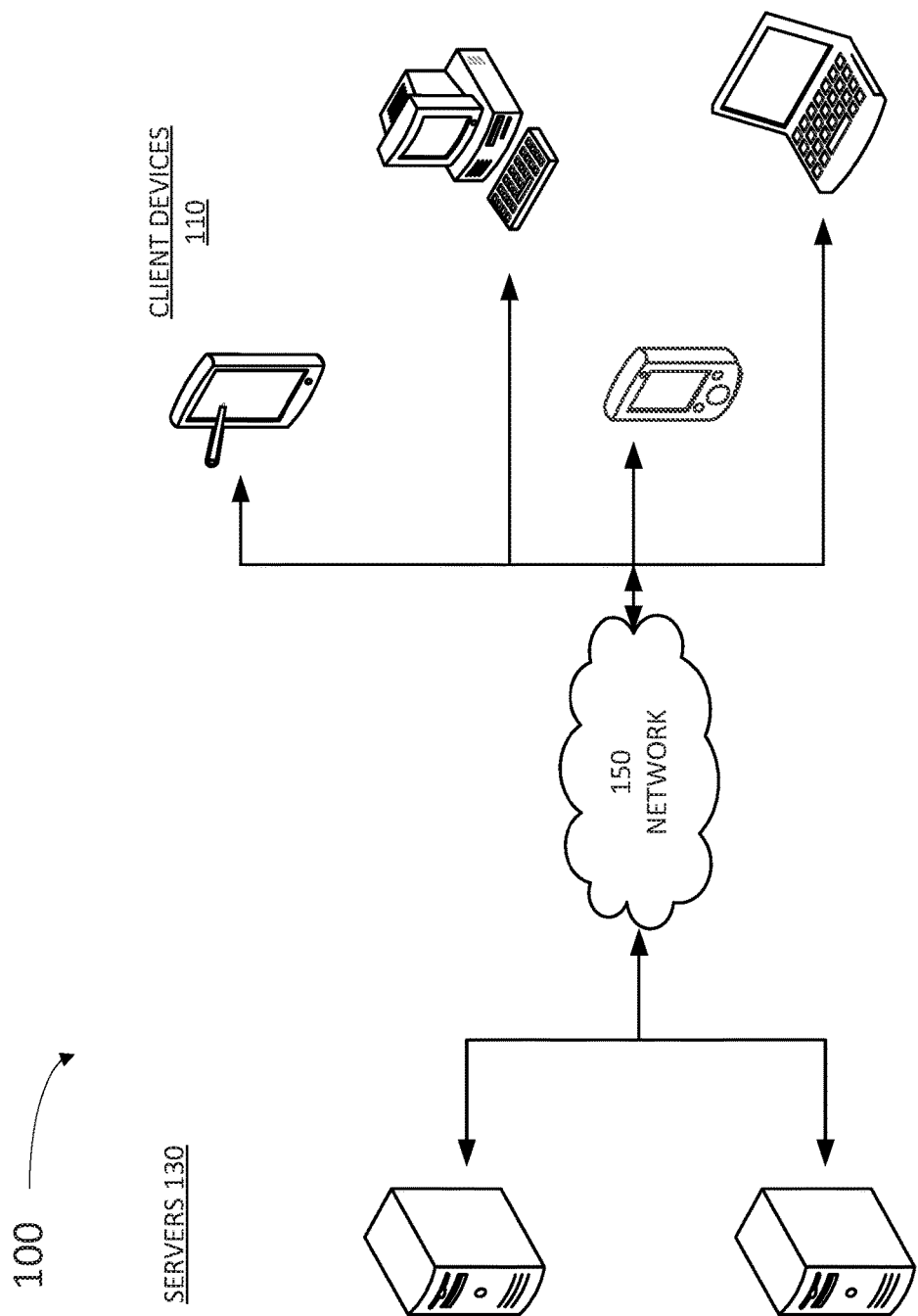
FIG. 1 illustrates an example architecture suitable for translating a text string between a source language and a target language, the source and target languages selected from multiple languages, according to some embodiments.

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

As used herein, the term "content item" may be used, for example, in reference to a digital file that is composed of one or more media elements of different types (text, image, video, audio, etc.). A content item can be a single picture or a single video file. The term "image identifier" as used herein may refer to a form of metadata such as a tag and a label, or a search query associated with an image for identifying the image.

The present disclosure uses the practical experience of language learning in humans, where visual media are useful to establish textual correlations, syntax, and grammar context to provide a translation tool that overcomes jargon and other language idiosyncrasies, and character complexity (e.g., Chinese characters, Cyrillic characters, Arabic characters and the like). For example, a picture of an apple with its subtext in French immediately relays the user to associate the French word "pomme" with the English word "apple" regardless of other, less relevant features present in the picture.

Images represent known, generically common objects and concepts in the human experience. For example, it is likely that users searching for an apple with queries entered in multiple different languages will target a similar image as a result of their search (e.g., a red apple). Embodiments as disclosed herein exploit an image database that handles a wealth of training data in the English language to train a computer vision model and to produce an image vector associated with an image. In some embodiments, the image vector is associated with a caption, a search query, or any other text string, describing a conceptual representation of the image. Typically, the image vector has a high dimensionality determined during the training of the computer model. The training of the computer model includes defining the meaning and content of each dimension of the image vector, based on images stored in the image database. It is reasonable to expect that the space of image vectors may cover, or at least have the potential to cover, visual concepts of relevance for multiple users. In some embodiments, image vectors from the vision model form a baseline language, used as a reference to perform a translation between a source language and a target language.

Embodiments as disclosed herein include trained language models that perform and continuously improve a mapping from a given language to the visual "language" represented by the feature vectors. In some embodiments, the mapping is obtained minimizing a cosine distance between a language vector generated by a language model, and an image vector produced by a vision model. The language model trained for both a source language and a target language generates an index mapping a vector for an input text string to a target language vector. Translation is done by computing the vector from a query in the source language, and then finding the target language vector in the index that minimizes the cosine distance.

In addition to syntax and grammar issues encountered by traditional sequence to sequence textual translations (e.g., translating word by word in a text sequence using a textual dictionary), there is a contextual component of a text translation that is often lost. For example, it is difficult for traditional translation engines to avoid errors when translating a word that has the same character sequence in two languages, but is associated to different semantic contents.

The disclosed system addresses this problem specifically arising in the realm of computer technology by providing a solution also rooted in computer technology, namely, by considering a learned embedded set for images and multilingual queries based on behavioral data (e.g., by multiple past users). Accordingly, the disclosed system forms the embedded set using N popular target language (e.g., English) queries into this space, where N is a pre-selected integer (e.g., the top N most popular queries, suitably scored according to a pre-determined user preference). When a user query is received in a source language, the user query is associated with a query vector in the embedded set. The system finds a close matching query vector in the target language index that was previously entered in the embedded set. In some embodiments, the system uses a query associated with the matching query vector in the target language index to perform the search in the target language. Thus, contextual content and semantic meaning of the user text string in the source language is maintained. Furthermore, the embedded set is populated with new user inputs as more users enter new data, thereby enhancing the translating accuracy and efficiency of the system.

The subject system provides several advantages, including an accurate and efficient language translation regardless of the complexity of contextual content, and also regardless of the type of characters used by the input or target languages. The system provides a machine learning capability where the system can learn from a content item and thereby improve accuracy and efficiency with usage.

Some embodiments provide the advantage that a variant of an initial query (e.g. "old timey map" over an initial search for "map" in Russian) provides similar results for the user. This is advantageous because in many instances, a user in an image search engine may not be entirely sure or precise about the exact terms to use in a textual input for a query, while having a clear idea of the desired image search result.

The proposed solution further provides improvements to the functioning of the computer itself because it saves data storage space by including image vectors and text string vectors of a pre-selected vector dimension in the embedded set, and reduces network usage (e.g., during an image or other multimedia file search) because the accuracy of the language translation ensures that the user will retrieve relevant images in a search result.

Example System Architecture

FIG. 1 illustrates an example architecture 100 for a translation tool suitable for practicing some implementations of the disclosure. The architecture 100 includes servers 130 and client devices 110 connected over a network 150. One of the many servers 130 is configured to host a memory including instructions which, when executed by a processor, cause the server 130 to perform at least some of the steps in methods as disclosed herein. In some embodiments, the processor is configured to find a translation of a first text string input by a user through client device 110 from a source language into a target language. The processor in server 130 associates the first text string to a first image in an image database by matching the first text string in a caption log, the caption associated with the first image. The processor may also be configured to find a second caption in the caption log associated with the first image, or with a second image that is similar to the first image. Accordingly, the processor may be configured to select the second caption as a second text string in the target language that is a translation of the first text string. The caption log and the image database can be searched using a translation tool (e.g., accessible through a web page or an application running on one of clients 110). For purposes of load balancing, multiple servers 130 can host memories including instructions to one or more processors, and multiple servers 130 can host the caption log and the image database.

Servers 130 may include any device having an appropriate processor, memory, and communications capability for hosting the caption log, the image database, and the translation tool. The translation tool may be accessible by various clients 110 over the network 150. Clients 110 can be, for example, desktop computers, mobile computers, tablet computers (e.g., including e-book readers), mobile devices (e.g., a smartphone or PDA), or any other devices having appropriate processor, memory, and communications capabilities for accessing the translation tool on one of servers 130. Network 150 can include, for example, any one or more of a local area network (LAN), a wide area network (WAN), the Internet, and the like. Further, network 150 can include, but is not limited to, any one or more of the following network topologies, including a bus network, a star network, a ring network, a mesh network, a star-bus network, tree or hierarchical network, and the like.

Figure 2:
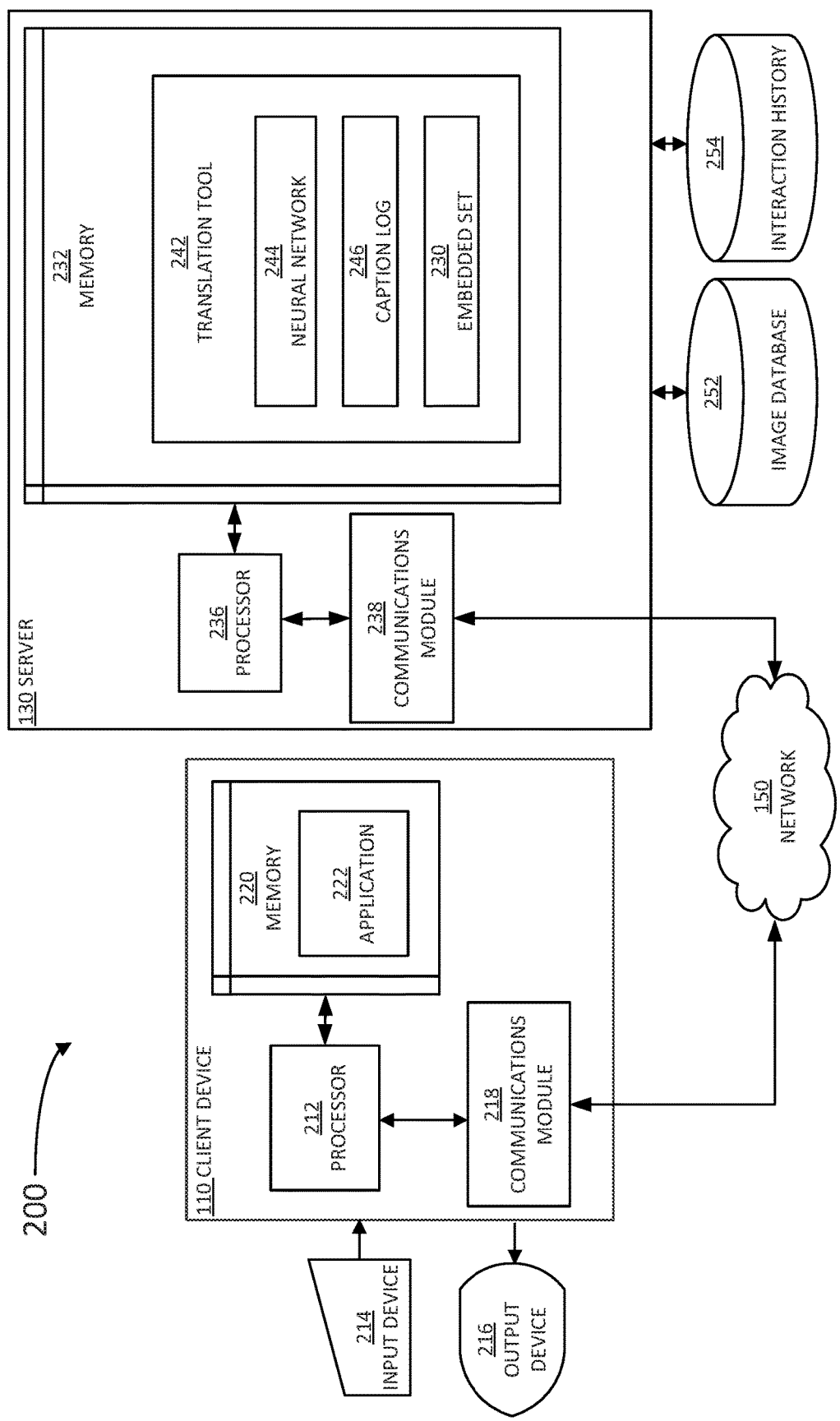
FIG. 2 is a block diagram illustrating an example server and client from the architecture of FIG. 1, according to certain aspects of the disclosure.

FIG. 2 is a block diagram 200 illustrating an example server 130 and client 110 in the architecture 100 of FIG. 1, according to certain aspects of the disclosure. Client 110 and server 130 are communicatively coupled over network 150 via respective communications modules 218 and 238. Communications modules 218 and 238 are configured to interface with network 150 to send and receive information, such as data, requests, responses, and commands to other devices on the network. Communications modules 218 and 238 can be, for example, modems or Ethernet cards.

Server 130 includes a memory 232, a processor 236, and communications module 238. Memory 232 includes an image database 252 and a translation tool 242 for searching image database 252. In one or more implementations, image database 252 represents a database that contains, for each image, a mapping from an image identifier to a data file containing pixel data for the image (e.g., in jpeg format). Processor 236 is configured to translate an input text string provided by the user by matching at least a portion of the input text string with a caption log 246. In some embodiments, caption log 246 may access an interaction history information from an interaction history 254, and from the input text string. The user interface is displayed for the user in an output device 216 of client 110. In some embodiments, caption log 246 includes a plurality of text strings previously used by one or more users interacting with translation tool 242. Moreover, in some embodiments, caption log 246 may include query strings, captions, and other associated text in multiple languages, and written with more than one character set (e.g., English, German, French in Latin characters, Chinese, Japanese, Korean, Russian, Arabic, Hindu and the like, in their respective characters). In some aspects, processor 236, using caption log 246 and executing instructions from memory 232, can provide a translated text string from a set of text strings from caption log 246 in translation tool 242.

The user may access translation tool 242 through an application 222 or a web browser installed in client 110. Execution of application 222 may be controlled by a processor 212 in client 110. Image database 252 can be, for example, a dataset associated with images corresponding to a number of style classes (e.g., about 25 or more). The images may be paired with image vector information and image caption information. The image vector information identifies vectors representing a large sample of images (e.g., about 50 million), and the image caption information identifies a semantic concept defined by a degree along each of the style classes. The vectors may be included in an embedded set 230 having a dimensionality based on the number of style classes. Accordingly, a text string vector in the embedded set may be associated with an image caption stored in caption log 246. In some embodiments, a single text string vector in the embedded set may be associated with multiple image captions in multiple languages. This may be the case when the text string vector corresponds to a straightforward semantic concept, for example, for a single substantive: "Apple," "Pear," "Cat," "Boat," "Tree," "Worm," and the like. In some embodiments, a more complex semantic concept may be represented as a cluster of closely located text string vectors for different languages, e.g., "the unbearable lightness of being," and the like. Moreover, in some embodiments, embedded set 230 includes an index for each image vector indicating that the specific vector is associated to an image in the image database, and further indicating or pointing to a location in the image database where the image is located. In some embodiments, the processor includes a translation tool configured to provide a plurality of images to the user in response to the user query. The plurality of images may be presented in a results panel of a user interface in a display of the client device.

In some embodiments, translation tool 242 is configured to execute commands and instructions from a neural network (NN) 244. NN 244 may include a language neural network (LNN), a deep neural network (DNN), or a convolutional neural network (CNN). In some embodiments, NN 242 may include a neural network configured as a vision model. In a DNN vision model as disclosed herein is trained as a feature extractor which maps variable sized images in the image database into image vectors in the embedded set, having a predetermined vector dimension. The DNN vision model is trained in a supervised manner in which the DNN vision model may be a classifier. In some embodiments, the DNN vision model could be trained purely unsupervised. The DNN vision model may also be trained using semi-supervised techniques in which each image has possibly multiple soft labels. Accordingly, the DNN vision model is trained to form an image vector in embedded set 230 by selecting a fixed-length subset of network activations such that there is a fixed mapping from images to the image vector in the embedded set (e.g., the fixed-length subset of network activations has a length equal to the pre-selected vector dimension of the embedded set).

In some embodiments, NN 244 includes a neural network configured as a language model. Accordingly, a DNN language model as disclosed herein is trained to map variable length sentences (character strings) into fixed length query vectors in the embedded set (where the length is fixed to the pre-selected vector dimension of the embedded set). The DNN language model is trained using a dataset of pairs, including an image from the image database and a text associated with the image (e.g., an image descriptor, or a comment posted by a user in an image file). For each image we generate its image embedding. The DNN language model may include a deep long short term memory (LSTM) network or a CNN and takes a variable length text (e.g., an input text string) in any language and maps it into a text string vector associated with the language. The text string vector associated with the language has the same dimensionality as the pre-selected vector dimension of the embedded set. The system trains the DNN language model, forming a text string vector (e.g., in the same manner as it would form a text string vector from a user input query in a search engine) and minimizing a distance in embedded set 230 between the text string vector and the image vector from the associated image. In some embodiments, the system further trains the DNN language model by maximizing a distance between the image vector from the associated image and text string vectors associated with other images.

In some embodiments, the system further creates an index of text string vectors in the target language in the embedded set using the trained DNN language model. Accordingly, the system selects, from an interaction history 254, the N most frequently used unique text strings in the target language to form a unique language text string set. Interaction history 254 may be stored in, or communicatively coupled with, memory 232 and translation tool 242. In certain aspects, processor 236 is configured to determine data for interaction history 254 by obtaining user interaction data identifying interactions with images from image search results that are responsive to search queries. For example, the processor 236 may determine that a user interacted with an image from a search result, such as by clicking on the image, saving the image for subsequent access, or downloading the image to a client (e.g., client 110), or the like. The processor 236 may keep track of the user interactions with a number of images over a given time period. The interaction history 254 may also include data indicating search behavior (and/or patterns) relating to prior image search queries.

For each text string in the unique language text string set, a text string vector in embedded set 230 is created with the DNN language model. The system stores the text string vector (e.g., in the memory 232), along with a pointer back to the text string associated with the text string vector (in the specific language that the text string was entered). Note that the text string vector thus formed includes a number of real (or complex) values indicating coordinates for the pre-selected vector dimensions. Also, the text string associated with the text string vector includes a variable length of characters that depends on the language used for the user input text string. In some embodiments, the memory stores a data structure, including the text string vector information as an N×M matrix. The N×M matrix stores the N text string vectors, each of size M. A separate N×I vector is stored as pointers from the text string vector to the text string in caption log 246.

Although image database 252, interaction history 254, and translation tool 242 are illustrated as being in the same memory 232 of a server 130, in certain aspects, the image database 252 and translation tool 242 can be hosted in a memory of a different server but accessible by server 130 illustrated in FIG. 2.

Processor 236 is configured to execute instructions, such as instructions physically coded into processor 236, instructions received from software in memory 232, or a combination of both. In some embodiments, processor 236 is configured to automatically identify the source language from the first text string. For example, the first text string may be entered as an English term or combination of terms. A user of client 110 may use input device 214 to submit the first text string via a user interface of application 222. The user interface may include an input section where the first text string may be typed in, for example. The input section may include one or more controls to allow the user to initiate the translation of the first text string to a target language upon receiving the first text string.

A first text string in a source language is then provisioned to translation tool 242 for initiating the translation through caption log 246, image database 252, and interaction history 254. The first text string is provided, for example, by the user accessing translation tool 242 over network 150 using application 222 in memory 220 on client 110. The user submits the first text string using input device 214 of client 110. In response to the user input, processor 212 in client 110 transmits the search query over the network 150 using communications module 218 of client 110 to communications module 238 of server 130.

Processor 236, upon receiving the first text string, submits a translation request to translation tool 242. In some embodiments, the user may explicitly request, together with the first input string, a target language to perform the translation. Accordingly, processor 236 may be configured to provide the target language selected by the user to translation tool 242. In some embodiments, processor 236 may automatically identify and provide to translation tool 242 the target language, based on data retrieved from interaction history 254. Further, in some embodiments, processor 236 may provide to application 222 a list of target language choices to the user. Accordingly, the list of target language choices may be selected from data retrieved from interaction history 254. In some embodiments, processor 236 may select the list of choices based at least partially on a geolocation data for client device 110. For example, in some embodiments, processor 236 may determine that the user is in Russia, in China, in Germany, or in any other geographic location, and therefore may desire to translate the first text string to the local language, or at least one of the local languages. For example, application 222 may display French and Italian choices, in addition to German, when the user is in Germany; Chinese, Korean, and Japanese choices, when the user is in Shanghai or Hong Kong, and the like. Processor 236 may then provide the translated text string, in the target language, to application 222 over network 150 for display by output device 216.

Figure 3:
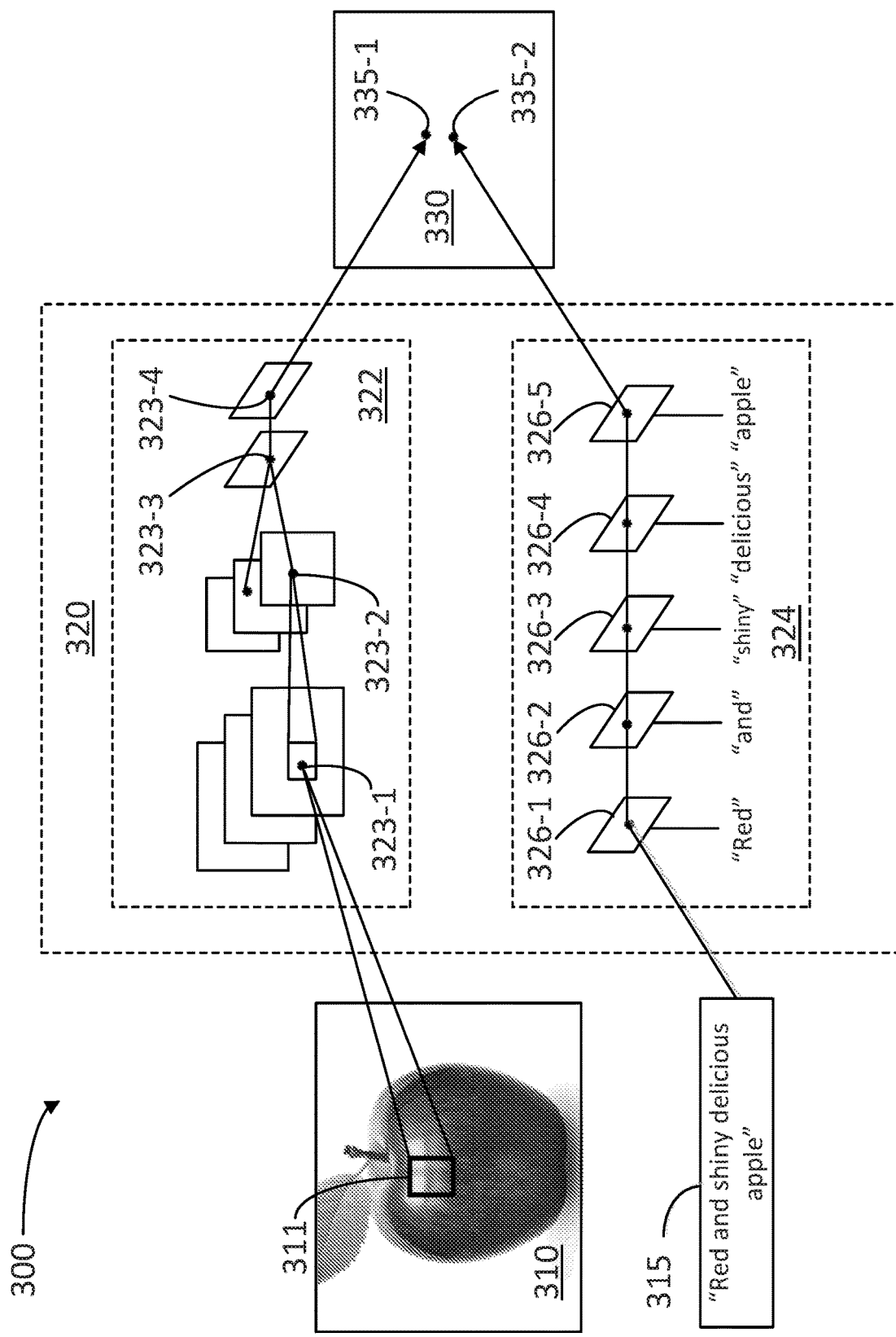
FIG. 3 is a block diagram illustrating a joint embedding of an image and an associated text string in an embedded set, according to some embodiments.

FIG. 3 is a block diagram illustrating a joint embedding 300 of an image 310 and an associated text string 315 in an embedded set 330 using an encoder 320, according to some embodiments. In some embodiments, methods consistent with the present disclosure include training multiple language models (e.g., a source language model and a target language model) to map text strings to vector representations of images in embedded set 330. Accordingly, a vision model may produce a reasonably consistent description of images of a given concept (e.g., a vision model from an image search engine). The language models will map a text string in either the source or target language to capture the same concept, within roughly the same area in embedded set 330. Because the vision model learns to generalize beyond the specific images that it has been trained to identify, search queries in different languages may relate to a set of somewhat different images. In relation to FIG. 1, for example, a text string in French for "pomme" may render different images of apples, such as a "green apple," while a text string in English for "apple" may render a "red apple." Regardless of the differences between red apple and green apple, it is generally expected that image vectors for each may be located in a close neighborhood in embedded set 330.

Encoder 320 may be part of one or more processors in a server (e.g., processor 236 in server 130). Embedded set 330 includes an image vector 335-1 and a text string vector 335-2 having the same dimensionality (e.g., the dimensionality of embedded set 330). In some embodiments, encoder 320 includes an image embedder 322 to provide image vector 335-1, and also includes a text string embedder 324 to provide text string vector 335-2. Image embedder 322 may include a domain-specific DNN classifier, which classifies image 310 into one of multiple classes. For example, image embedder 322 may select a feature 311 (e.g., red shiny skin) to follow through a CNN classification with stages 323-1 through 323-4 (collectively referred to hereinafter as stages 323) to obtain image vector 335-1. The CNN classification includes a number of classes that may be derived from prior image searches stored in interaction history 254 and may increase as image database 252 increases in size. The number of classes (e.g., the dimensionality of embedded set 330) may be in the hundreds, the thousands, or even more. In certain aspects, a CNN in image embedder 322 includes a stack of convolutional layers 323-1 and 323-2 followed by several fully connected layers (e.g., 323-3). The CNN may be part of NN 240 and can include a loss layer 323-4 (e.g., softmax or hinge loss layer) to back-propagate errors so that the CNN learns and adjusts its weights to better fit provided image data.

In some embodiments, image embedder 322 and text string embedder 324 in encoder 320 are trained using image 310 and associated text string 315, selected from the most popular queries in an image search engine with the images that were downloaded for those queries. Encoder 320 may be trained to obtain image vector 335-1 and text string vector 335-2 close to one another in embedded set 330. In some embodiments, image 310 may be one of the closest image searches retrieved when text string 315 is input as a search query in an image search engine.

Image embedder 322 and text string embedder 324 take a piece of intelligible information and embed it into a dense vector space (e.g., embedded set 330), such that similar pieces of information are close to each other, regardless of whether they are related to image vector 335-1 or to text string vector 335-2. A measure of distance in embedded set 330 may be as normally defined in an N-dimensional space (where N is any integer number), such as a cosine distance, and the like. Some embodiments provide image captioning capabilities by looking in embedded set 330 for a text string vector 335-2 that is close to image vector 335-1. Moreover, multiple text string vectors 335-2 may be associated with image vector 335-1 in a single language or in multiple languages. Accordingly, joint embedding 300 may be used as a translation engine. For example, a first text string in the source language associated to a first text string vector can be translated into a second text string in the target language associated to a second text string vector, wherein the first text string vector and the second text string vector are close to one another in embedded set 330. Such translation, though mediated by an image embedding (e.g., through the proximity of the first and second text string vectors to image vector 335-1), may not involve displaying image 310 to the user.

In some embodiments, image embedder 322 includes a DNN having at least one of a classifier or a regressor. For example, in some embodiments, a regressor model generates continuous variable output, whereas a classifier model generates discrete class labels. Alternatively, the DNN could be trained as a deep auto-encoder or as a generative adversarial network (GAN). In some embodiments, a GAN includes two competing NN models. A first NN model takes noise as input and generates samples (accordingly, the first NN is called the "generator"). A second NN model (e.g., the "discriminator") receives samples from both the generator and the training data, and distinguishes between the two sources. The generator NN and the discriminator NN play a continuous evolution where the generator learns to produce more realistic samples, and the discriminator learns to improve the distinction between generated data and real data. In some embodiments, the generator NN and the discriminator NN are trained simultaneously, and the continuous evolution of the two NN models drives the generated samples to be indistinguishable from real data. In some embodiments, a deep auto-encoder learns a representation (encoding) for a set of data, e.g., for the purpose of dimensionality reduction. In some embodiments, the DNN vision model is trained using semi-supervised techniques in which each image from the image database may include multiple soft labels. Once the model is trained, an image embedding model selects a fixed length subset of network activations such that there is a fixed mapping from images to image vectors in the embedded set.

Text string embedder 324 provides text string vector 335-2 as a vector representation of text string 315, using an LNN having multiple layers 326-1 through 326-5 (hereinafter collectively referred to as "LNN layers 326"). In some embodiments, each one of LNN layers 326 may be associated with one word from query 315. For example, when text query 315 is "Steam ship at the dock," layer 326-1 may be associated to the word "Steam," coupled with layer 326-2 associated with the word "ship," with layer 326-3 associated with the word "at," with layer 326-4 associated with the word "the," and with layer 326-5 associated with the word "dock." In some embodiments, the LNN maps variable length sentences (e.g., text string 315) into fixed length text string vectors (text embedding) in embedded set 330 (e.g., text string vector 335-2 having a fixed dimensionality). In some embodiments, the LNN may include a deep long short-term memory (LSTM) neural network.

In some embodiments, text string embedder 324 is trained on positive and negative pairs of text strings 315 and images 310. For example, a positive pair includes image vector 335-1 and text string vector 335-2, wherein image vector 335-1 is associated to an image 310, selected by one or more users in an image search engine, in which at least one of the users entered text string 315 as a query. A negative pair may include text string 315 randomly matched to image 310 (e.g., text strings 315 randomly selected from caption log 246). The positive and negative pairs are included in a superset of the data (e.g., embedded set 330) used to train the image embedder. This superset may include millions of positively matched text strings and images, thereby enhancing the accuracy of text string embedder 324. In some embodiments, language embedder 324 is trained using a loss function that maximizes the difference between each corresponding positive and negative pair. The training may define a first distance between image vector and text string vector in the positive pair, and a second distance between image vector and text string vector in the negative pair. Further, the training may select coefficients in the different layers LNN of text string embedder 324 (e.g., layers 326) such that a difference between the first distance and the second distance is maximized. Moreover, in some embodiments, the training may select multiple positive distances associated with multiple positive pairs for image 310, and multiple negative distances associated with multiple negative pairs for the same image 310. Further, the training may select coefficients in the LNN of text string embedder 324 such that an aggregate value of positive distances is minimized while an aggregated value of negative distances is maximized.

Figure 4:
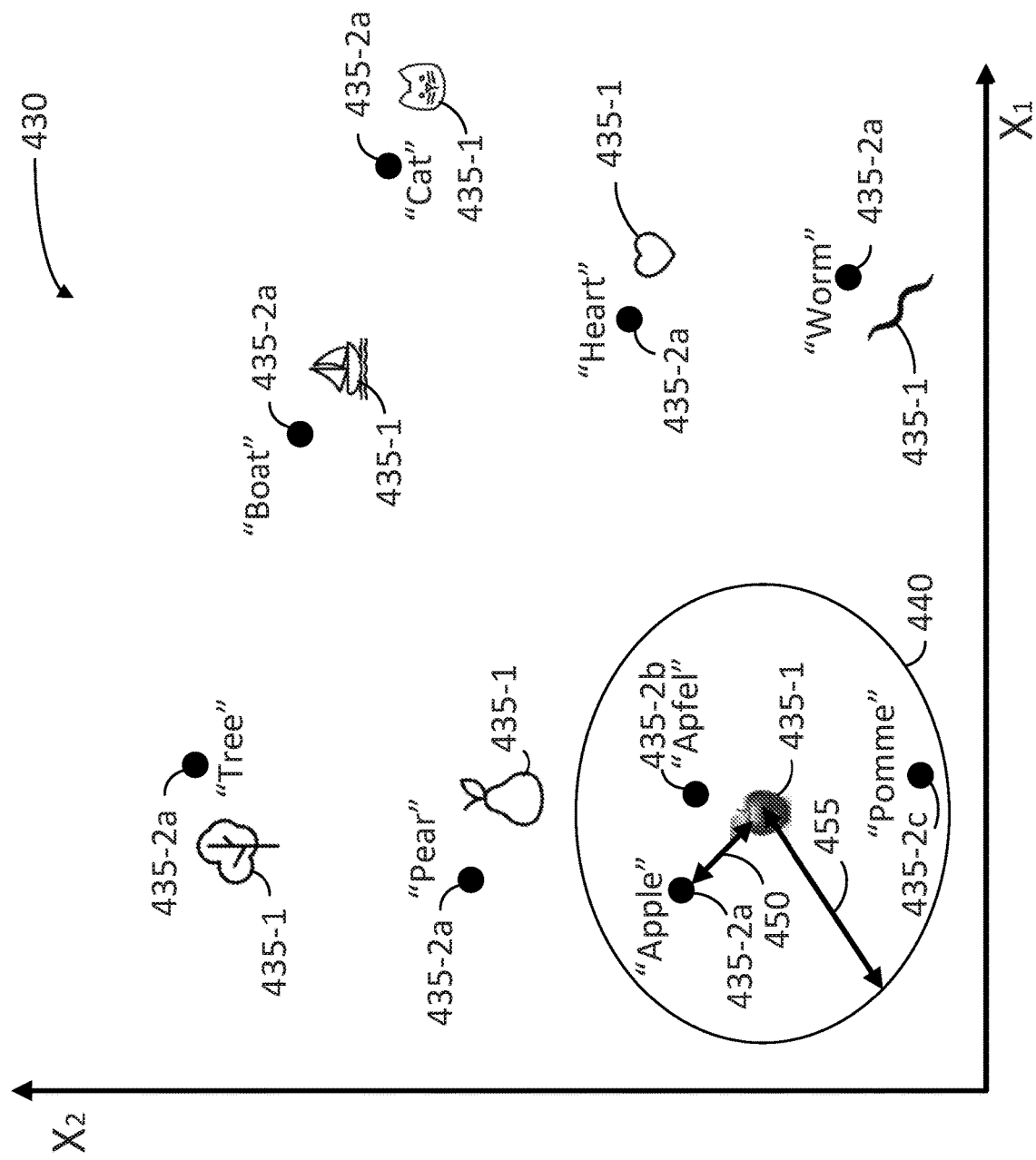
FIG. 4 illustrates a chart of an embedded set including image vectors and text string vectors, according to a joint embedding method as disclosed herein.

FIG. 4 illustrates a chart of an embedded set 430 including image vectors 435-1 and text string vectors 435-2a, 435-2b, 435-2c, (hereinafter collectively referred to as "vectors 435"), according to a joint embedding method as disclosed herein. Vectors 435 have an abscissa $X_1$ and an ordinate $X_2$, selected by an encoder (e.g., encoder 320). For illustration purposes, only two dimensions ($X_1$, and $X_2$) are shown in the figure. In some embodiments, each dimension $X_1$ or $X_2$ may be associated with a classification type. More generally, the dimensionality of embedded set 430 may be as high as several hundred dimensions. Embedded set 430 is dense, including multiple clusters 440 of closely related vectors 435.

A cosine distance, D 450, between any two vectors 435, $\vec{A}$, and $\vec{B}$, in embedded set 430 may be obtained from the mathematical expression $$D = 1 - \frac{\vec{A} \cdot \vec{B}}{|\vec{A}||\vec{B}|}, \quad (1)$$

where the "dot" product "·" may be suitably defined for the vector space that includes vectors $\vec{A}$ and $\vec{B}$, and $|\vec{A}|$ and $|\vec{B}|$, are generally "lengths" associated to vectors $\vec{A}$ and $\vec{B}$, respectively, in the vector space.

Cluster 440 may be defined as a set of vectors 435 such that D 450 between any two vectors in cluster 440 is less than a pre-selected threshold, T 455. Other definitions for cluster 440 based on different functions and combinations of D 450 may be used, based on a specific emphasis or bias that the translation tool may apply.

Each cluster 440 may be associated with images (e.g., image 310) belonging in a class of images. For example, cluster 440 includes image vector 435-1. Further, each cluster 440 may be associated with a conceptual representation of the images in the cluster (e.g., image 435-1), included in text string vectors 435-2a, 435-2b, and 435-2c (collectively referred to, hereinafter, as "text string vectors 435-2"). The conceptual representation of images in cluster 440 may be expressed in multiple languages. For example, text string vector 435-2a may be associated with the conceptual representation of image vector 435-1, in English (e.g., "Apple"). Further, text string vector 435-2b may be associated with the conceptual representation of image vector 435-1 in German (e.g., "Apfel"). And text string vector 435-2c may be associated with the conceptual representation of image vector 435-1 in French (e.g., "Pomme"). In some embodiments, text string vectors 435-2 may include, in addition to values in the multiple dimensions (e.g., $X_1$ and $X_2$), an indicator to determine the language of text string associated with the text string vector. Accordingly, the translation tool may be able to identify a source language and a target language within vectors 435-2 in cluster 440.

A translation tool as disclosed herein may select near (e.g., nearest) neighbors in the embedded set (e.g., according to cosine distance D 450). For example, text string vectors 435-2a and 435-2b may correspond to an English-German translation of the conceptual representation of image 435-1. The method may further include receiving a first text string in a source language (e.g., English) from a user via a client device. The translation tool may associate the first text string in the source language to a first text string vector 435-2a in embedded set 430. Further, the method may include selecting a second text string vector 435-2b in a target language (e.g., German), wherein first text string vector 435-2a and second text string vector 435-2b belong in the same cluster. Accordingly, the method may include identifying cluster 440 around first text string vector 435-2a, and selecting a text string vector 435-2 in the target language within cluster 440 to be second text string vector 435-2b. In some embodiments, more than one text string vector in the target language may be within cluster 440. In such case, the method may select as a second text string vector the one text string vector in the target language that is closer to the first text string vector according to D 450.

Embedded set 430 also illustrates other image vectors 435-1: a Boat, a Cat, a Heart, a Worm, a Pear, and a Tree, and their relative positions in the ($X_1$, $X_2$) plane-projection of embedded set 430. The corresponding text string vectors in the English language, 435-2a, namely "Boat," "Cat," "Heart," "Worm," "Pear," "Tree," are also illustrated. For clarity of illustration, other text string vectors 435-2 are not illustrated for these images (e.g., the corresponding text string vectors for the German words "Boot," "Katz," "Hertz," "Wurm," "Birne," and "Baum," respectively. And for the French words "Bateau," "Chat," "Coeur," "Ver," "Poire," "Arbre"). However, it is understood that such text string vectors in other languages would be in a proximity to each of the images referred, and their respective English word.

Figure 5:
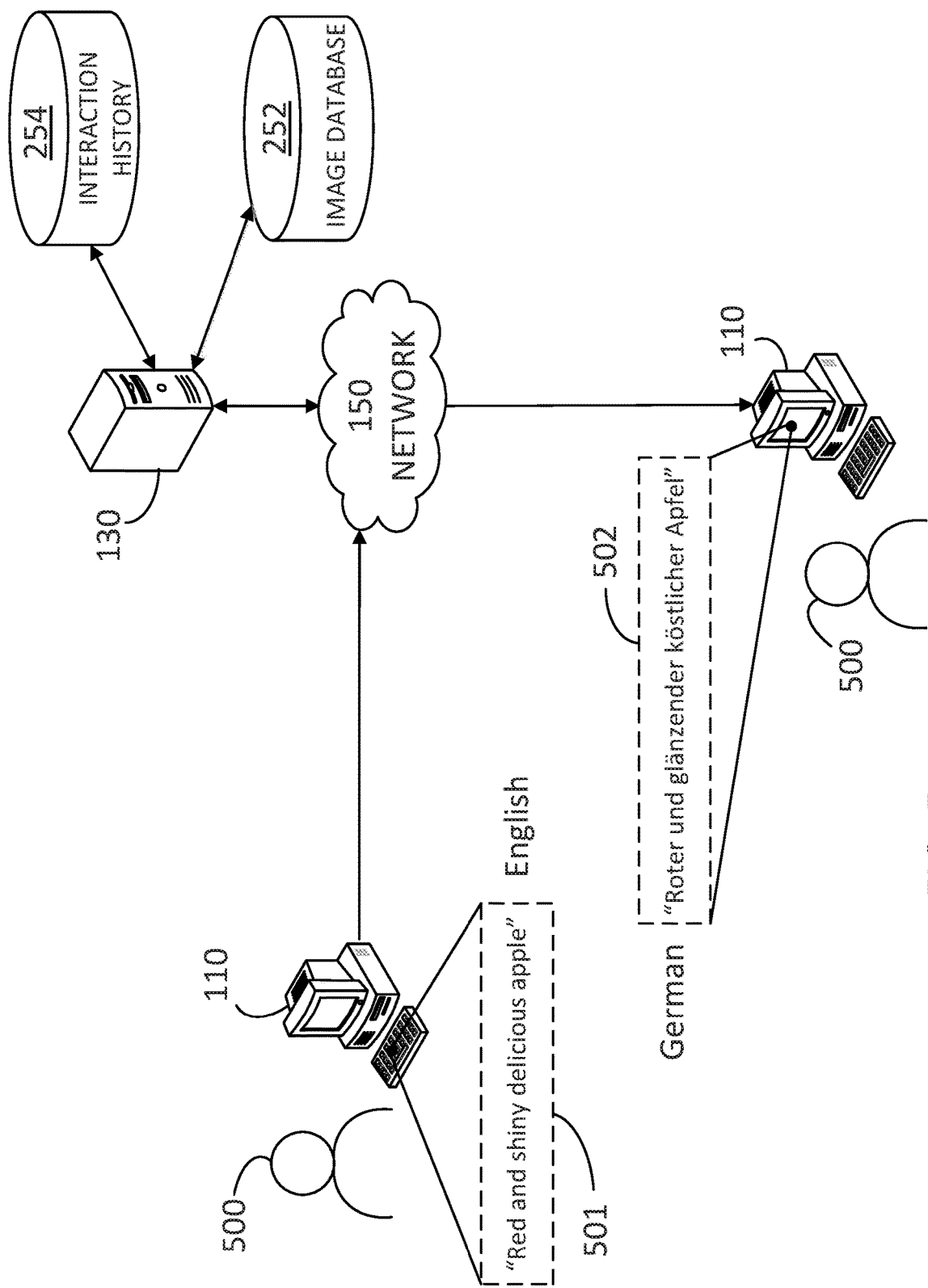
FIG. 5 illustrates a user accessing a translation tool to translate an input text string from English to German, according to some embodiments.

FIG. 5 illustrates a user 500 accessing a translation tool (e.g., translation tool 242) to translate an input text string from English to German, according to some embodiments. The user may run an application (e.g., application 222) installed in client device 110 and configured to interact with the translation tool in server 130 through network 150. Accordingly, the user may include an input text string 501 (e.g., in English) such as "Red and shiny delicious apple" and request a translation into German. The translation tool applies algorithms and methods as disclosed herein, involving access to retrieve data from image database 252 and interaction history 254 and provides a second text string 502, "Rotex und glänzender köstlicher Apfel," which is the German translation of first text string 501.

Figure 6:
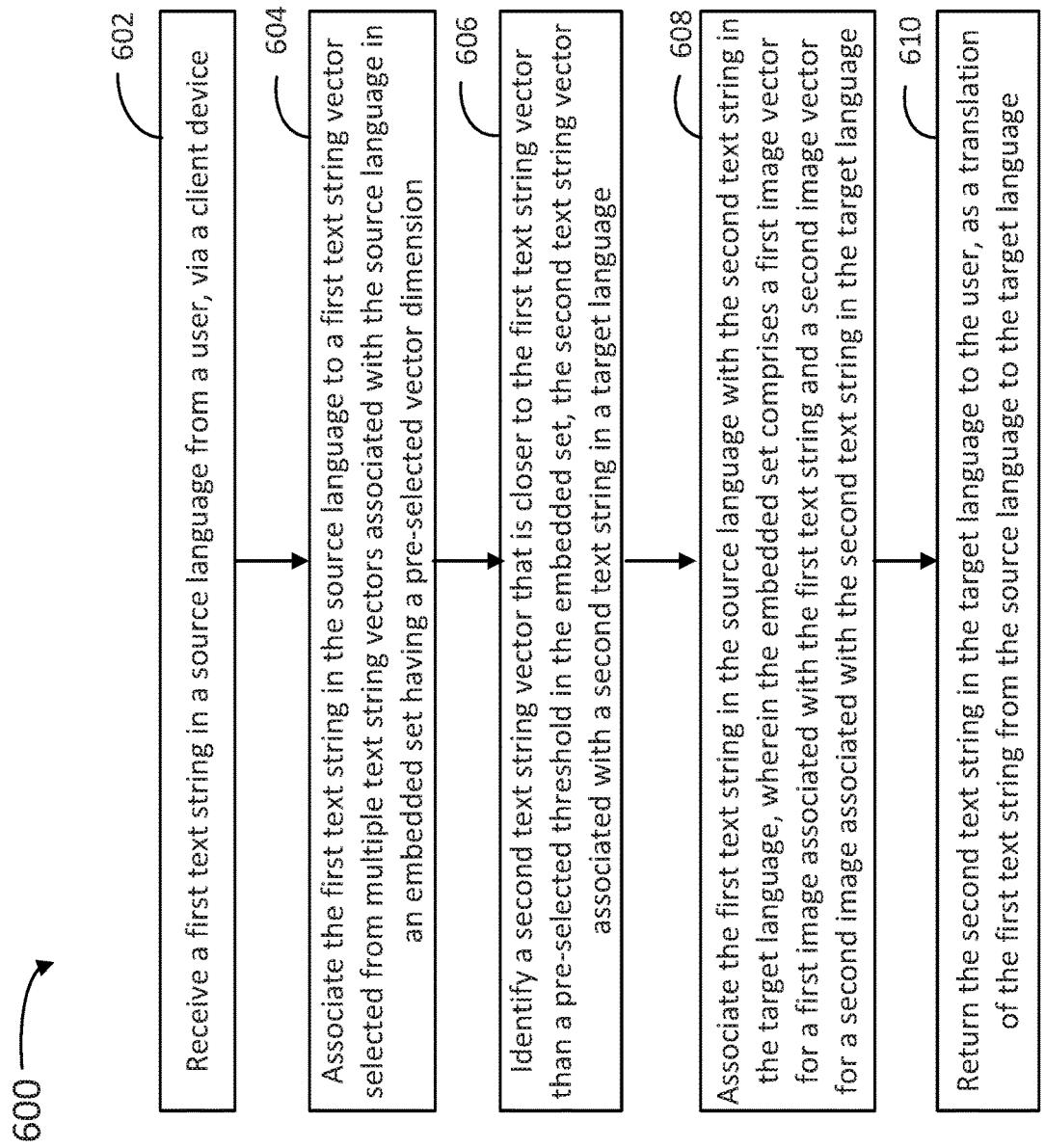
FIG. 6 is a flow chart illustrating steps in a method for translating an input text string from a source language into an output text string in a target language, according to some embodiments.

FIG. 6 is a flow chart illustrating steps in a method 600 for translation of an input text string from a source language into an output text string in a target language, according to some embodiments. Method 600 may be performed at least partially by any one of network servers hosting a collection of images, videos, and multimedia files (e.g., images and video clips), while communicating with any one of a plurality of client devices (e.g., any one of servers 130 and any one of client devices 110). The client devices may be handled by a user, wherein the user may be registered to a private account with the server, or may be a visitor to the server website or logged in a server application installed in the client device (e.g., application 222). At least some of the steps in method 600 may be performed by a computer having a processor executing commands stored in a memory of the computer (e.g., processors 212 and 236, memories 220 and 232). Further, steps as disclosed in method 600 may include retrieving, editing, and/or storing files in a database that is part of, or is communicably coupled to, the computer, using, inter-alia, a translation tool (e.g., translation tool 242). The database may include any one of an image database, a caption log, and an interaction history database (e.g., image database 252, caption log 246, and interaction history database 254). Methods consistent with the present disclosure may include at least some, but not all of, the steps illustrated in method 600, performed in a different sequence. Furthermore, methods consistent with the present disclosure may include at least two or more steps as in method 600 performed overlapping in time, or almost simultaneously.

Step 602 includes receiving a first text string in a source language from a user, via a client device. In some embodiments, step 602 includes identifying the source language based on the first text string.

Step 604 includes associating the first text string in the source language to a first text string vector in the source language. In some embodiments, the first text string vector may be selected from a plurality of text string vectors associated with the source language in an embedded set having a pre-selected vector dimension. In some embodiments, step 604 includes adding the first text string and the first text string vector to a caption log for a future use.

Step 606 includes identifying a second text string vector that is closer to the first text string vector than a pre-selected threshold in the embedded set, the second text string vector associated with a second text string in a target language. In some embodiments, step 606 includes determining a cosine distance between the second text string vector and the first text string vector with multiple coordinates of each of the first text string vector and the second text string vector in the embedded set. In some embodiments, step 606 includes selecting a dimensionality of the embedded set using a neural network in the image search engine, wherein the dimensionality is based on discrete classes associated with the first image and the second image. In some embodiments, step 606 includes identifying the target language based on at least one of an interaction history for the user, a geolocation for the user, and the source language.

In some embodiments, step 606 includes selecting the second text string vector from one or more text string vectors in the cluster, the one or more text string vectors associated with the target language.

Step 608 includes associating the first text string in the source language with the second text string in the target language, wherein the embedded set includes a first image vector for a first image associated with the first text string and a second image vector for a second image associated with the second text string in the target language. In some embodiments, the second image vector is the same as the first image vector. In some embodiments, the second image vector is close to, but different from, the first image vector, wherein the classification of "close" or "not close" is provided by a distance measure in the embedded set, and a pre-selected threshold (e.g., a distance shorter than the pre-selected threshold is 'close," and a distance longer than the pre-selected threshold is "not close"). In some embodiments, the first image and the second image are different images that belong within a cluster in the embedded set. In some embodiments, step 608 includes associating a value for a classification based on a frequency of use of each word from the first text string in multiple captions stored in a caption log associated with the classification.

Step 610 includes returning the second text string in the target language to the user, as a translation of the first text string from the source language to the target language. In some embodiments, step 610 includes selecting a modified first text string by replacing at least one word with a synonym in the source language, and identifying a synonym in the target language to the at least one word from the second text string corresponding to the modified first text string and adding the synonym to a dictionary. The dictionary translates the source language to the target language. In some embodiments, step 610 includes providing a modified text string by adjusting a grammatical syntax of the first text string and identifying a grammatical syntax in the target language from the second text string corresponding to the modified text string.

Figure 7:
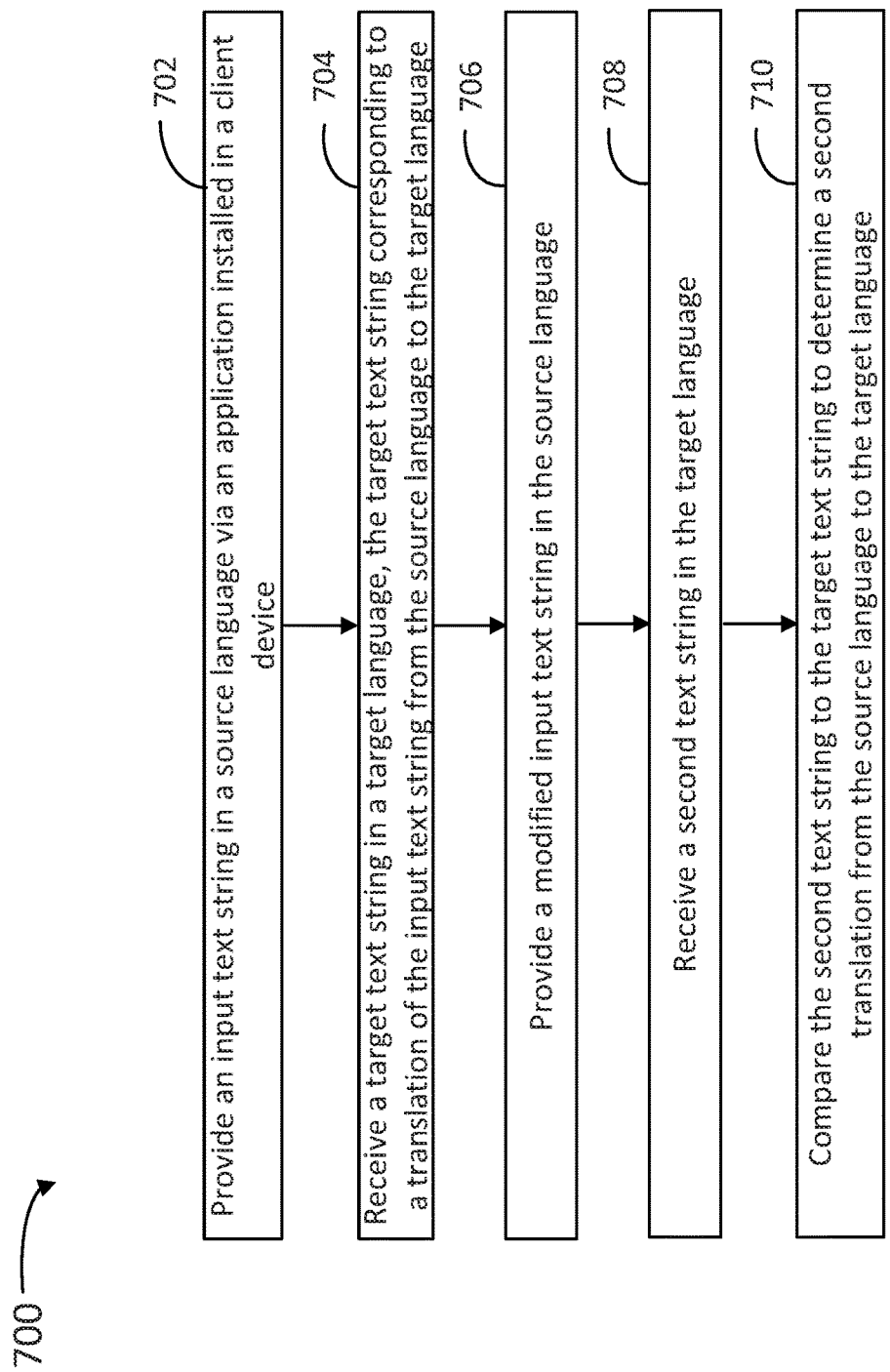
FIG. 7 is a flow chart illustrating steps in a method to translate an input text string in a source language into an output text string in a target language via an application on a client device, according to some embodiments.

FIG. 7 is a flow chart illustrating steps in a method 700 to translate an input text string in a source language into an output text string in a target language via an application on a client device, according to some embodiments. Method 700 may be performed at least partially by any one of client devices (e.g., any one of servers 130 and any one of clients 110) communicating with any one of network servers hosting a collection of images, videos, and multimedia files (e.g., images and video clips). The client devices may be handled by a user, wherein the user may be registered to a private account with the server, or may be a visitor to the server website or logged in a server application installed in the client device. At least some of the steps in method 300 may be performed by a computer having a processor executing commands stored in a memory of the computer (e.g., processors 212 and 236, memories 220 and 232). Further, steps as disclosed in method 700 may include retrieving, editing, and/or storing files in a database that is part of, or is communicably coupled to, the computer, using, inter-alia, a translation tool (e.g., translation tool 242). The database may include any one of an image database, a query stream log and an interaction history database (e.g., image database 252, caption log 246, and interaction history database 254). Methods consistent with the present disclosure may include at least some, but not all of, the steps illustrated in method 700, performed in a different sequence. Furthermore, methods consistent with the present disclosure may include at least two or more steps as in method 700 performed overlapping in time, or almost simultaneously.

Step 702 includes providing an input text string in a source language via an application installed in a client device. In some embodiments, step 702 includes adjusting a grammatical syntax of the input text string.

Step 704 includes receiving a target text string in a target language, the target text string corresponding to a translation of the input text string from the source language to the target language.

Step 706 includes providing a modified input text string in the source language. In some embodiments, step 706 includes selecting the modified input text by replacing at least one word with a synonym in the source language and adding the synonym to a dictionary, wherein the dictionary translates the source language to the target language.

Step 708 includes receiving a second text string in the target language.

Step 710 includes comparing the second text string to the target text string to determine a second translation from the source language to the target language. In some embodiments, step 710 includes finding a grammatical syntax in the target language.

Hardware Overview

Figure 8:
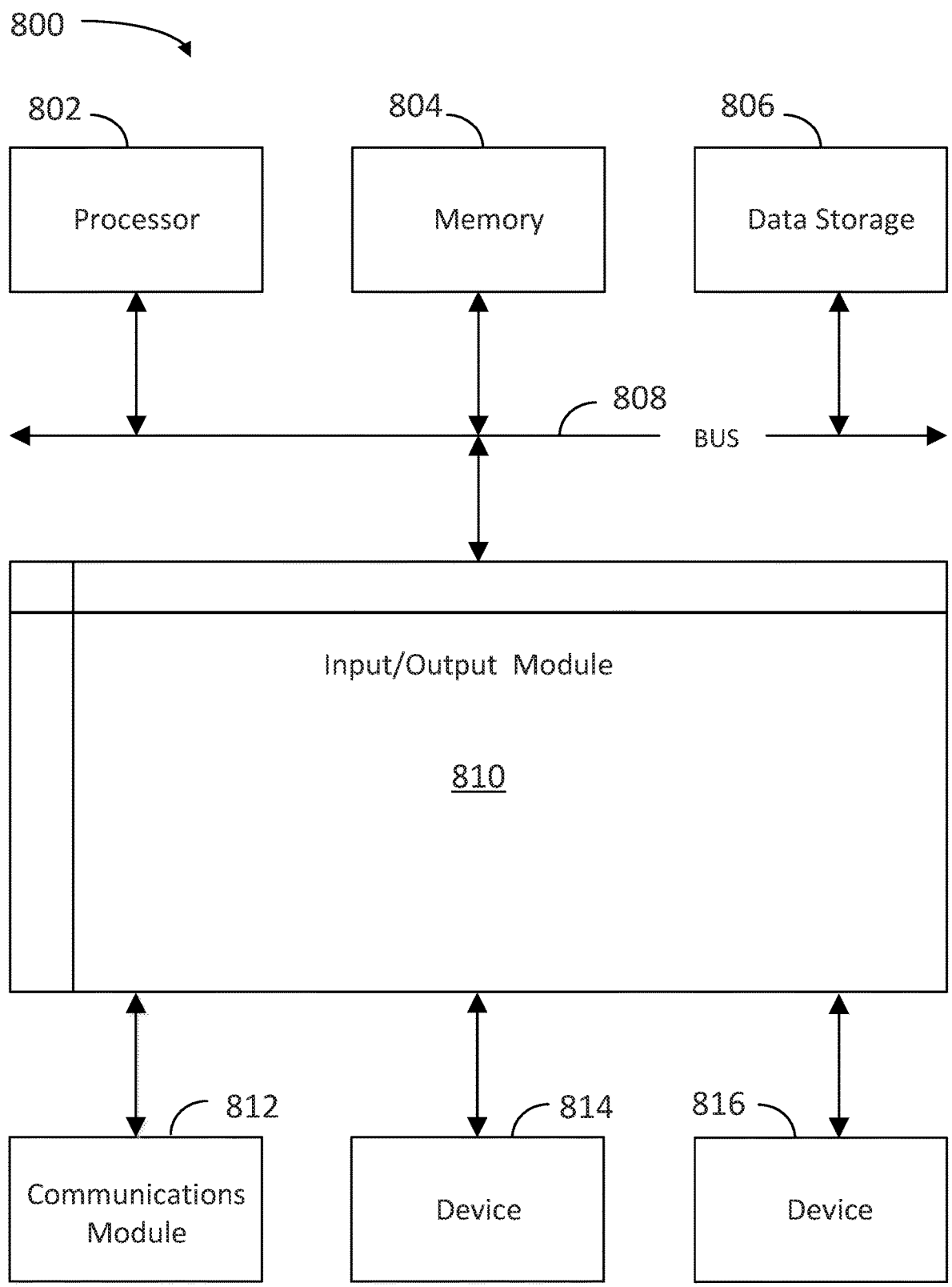
FIG. 8 is a block diagram illustrating an example computer system with which the client and server of FIGS. 1 and 2 and the methods of FIGS. 6 and 7 can be implemented.

FIG. 8 is a block diagram illustrating an exemplary computer system 800 with which the client 110 and server 130 of FIGS. 1 and 2, and the methods of FIGS. 6 and 7 can be implemented. In certain aspects, the computer system 800 may be implemented using hardware or a combination of software and hardware, either in a dedicated server, or integrated into another entity, or distributed across multiple entities.

Computer system 800 (e.g., client 110 and server 130) includes a bus 808 or other communication mechanism for communicating information, and a processor 802 (e.g., processors 212 and 236) coupled with bus 808 for processing information. By way of example, the computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 800 can include, in addition to hardware, code that creates an execution environment for the computer program in question, e.g., code that constitutes processor firmware, a protocol stack, a database management system, an operating system, or a combination of one or more of them stored in an included memory 804 (e.g., memories 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. The processor 802 and the memory 804 can be supplemented by, or incorporated in, special purpose logic circuitry.

The instructions may be stored in the memory 804 and implemented in one or more computer program products, i.e., one or more modules of computer program instructions encoded on a computer readable medium for execution by, or to control the operation of, the computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. Input/output module 810 can be any input/output module. Exemplary input/output modules 810 include data ports such as USB ports. The input/output module 810 is configured to connect to a communications module 812. Exemplary communications modules 812 (e.g., communications modules 218 and 238) include networking interface cards, such as Ethernet cards and modems. In certain aspects, input/output module 810 is configured to connect to a plurality of devices, such as an input device 814 (e.g., input device 214) and/or an output device 816 (e.g., output device 216). Exemplary input devices 814 include a keyboard and a pointing device, e.g., a mouse or a trackball, by which a user can provide input to the computer system 800. Other kinds of input devices 814 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 816 include display devices, such as an LCD (liquid crystal display) monitor, for displaying information to the user.

According to one aspect of the present disclosure, the client 110 and server 130 can be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 can be, for example, and without limitation, a desktop computer, laptop computer, or tablet computer. Computer system 800 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires forming bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No clause element is to be construed under the provisions of 35 U.S.C. § 112, sixth paragraph, unless the element is expressly recited using the phrase "means for" or, in the case of a method clause, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
   providing an input text string in a source language via an application installed in a client device;
   receiving a target text string in a target language, the target text string corresponding to a first translation of the input text string from the source language to the target language;
   replacing at least one word in the input text string with a synonym in the source language to form a modified input text string;
   providing the modified input text string in the source language;
   receiving a second text string in the target language; and
   comparing the second text string to the target text string to determine a second translation from the source language to the target language, wherein replacing at least one word in the input text string comprises performing a search in an image search engine for the at least one word in the source language, and selecting a caption for an image provided as a result of an image search.

2. The computer-implemented method of claim 1, wherein:
   providing the modified input text string comprises adjusting a grammatical syntax of the input text string; and
   determining the second translation from the source language to the target language comprises identifying a grammatical syntax in the target language.

3. The computer-implemented method of claim 1, wherein receiving the second text string comprises receiving a second text string vector according to a grammatical syntax in the target language.

4. The computer-implemented method of claim 1, wherein replacing at least one word in the input text string comprises selecting the at least one word based on a syntactic value of the at least one word in the input text string.

5. The computer-implemented method of claim 1, wherein comparing the second text string to the target text string comprises identifying a syntactic value of at least one word in the target language.

6. The computer-implemented method of claim 1, further comprising adding the synonym to a dictionary based on the second text string, wherein the dictionary translates the source language to the target language.

7. The computer-implemented method of claim 1, further comprising selecting one of the first translation or the second translation based on a syntax and a semantic content of the input text string in the source language.

8. The computer-implemented method of claim 1, further comprising:
   identifying a synonym in the target language to at least one word from the second text string corresponding to the modified input text string; and
   adding the synonym to a dictionary, wherein the dictionary translates the source language to the target language.

9. The computer-implemented method of claim 1, further comprising:
   providing a modified text string by adjusting a grammatical syntax of the input text string; and
   identifying a grammatical syntax in the target language from the second text string corresponding to the modified text string.

10. The computer-implemented method of claim 1, further comprising selecting the target language from a menu in the application installed in the client device.

11. The computer-implemented method of claim 1, further comprising providing the source language in addition to the input text string.

12. A system comprising:
    one or more processors; and
    a memory coupled to the one or more processors, the memory including instructions that, when executed by the one or more processors, cause the one or more processors to:
    provide an input text string in a source language via an application installed in a client device;
    receive a target text string in a target language, the target text string corresponding to a first translation of the input text string from the source language to the target language;
    replace at least one word in the input text string with a synonym in the source language to form a modified input text string;
    provide the modified input text string in the source language;
    receive a second text string in the target language; and compare the second text string to the target text string to determine a second translation from the source language to the target language, wherein to replace at least one word in the input text string the one or more processors execute instructions to search in an image search engine for the at least one word in the source language, and to select a caption for an image provided as a result of an image search.

13. The system of claim 12, wherein the one or more processors further execute instructions to:
provide a modified input text string comprising adjusting a grammatical syntax of the input text string; and
identify a grammatical syntax in the target language.

14. The system of claim 12, wherein to receive the second text string vector the one or more processors execute instructions to receive a second text string vector according to a grammatical syntax in the target language.

15. The system of claim 12, wherein to replace at least one word in the input text string the one or more processors execute instructions to select the at least one word based on a syntactic value of the at least one word in the input text string.

16. The system of claim 12, wherein to compare the second text string to the target text string the one or more processors execute instructions to identify a syntactic value of at least one word in the target language.

17. The system of claim 12, wherein the one or more processors further execute instructions to add the synonym to a dictionary based on the second text string, wherein the dictionary translates the source language to the target language.

18. The system of claim 12, wherein the one or more processors further execute instructions to select one of the first translation or the second translation based on a syntax and a semantic content of the input text string in the source language.

\* \* \* \* \*